Nov. 27, 1934.  A. M. HARTMANN  1,982,098
WELDING ELECTRODE
Filed July 1, 1931

INVENTOR.
ALEXANDER M. HARTMANN
BY
John P. Tarbox
ATTORNEY.

Patented Nov. 27, 1934

1,982,098

UNITED STATES PATENT OFFICE 1,982,098

WELDING ELECTRODE

Alexander M. Hartmann, Philadelphia, Pa., assignor to Edward G. Budd Manufacturing Company, Philadelphia, Pa., a corporation of Pennsylvania Application July 1, 1931, Serial No. 548,075

2 Claims. (Cl. 219—4)

The present invention relates to an improved electrode for electric welding and particularly for spot welding, in which the electrodes are forced against the work with considerable pressure to effect, with the passage of the welding current, a homogeneous union of the metals at the weld.

Since the metal of the electrode through which the electric current passes requires, for efficient welding to be a metal or metal alloy of high electric conductivity, such as copper, it tends to mushroom in a short time under the pressure and heat of welding, and it has therefore been proposed to support such relatively soft electrode metal by a metal or other material, such as steel, having a high compression factor and adapted to take the pressure load of welding. As heretofore proposed, said reinforcing metal was placed in direct contact with the high conductivity metal of the electrode so that the heat of the weld was rapidly transferred to it and it became so highly heated in a short time that it would stick to the metal being welded.

To overcome this difficulty is the main object of this invention, and this is accomplished by spacing the metal of high conductivity from the metal of lower conductivity but higher compression factor by a layer of insulating material. In this way the heat of the weld which is very high in the metal of high conductivity and is very rapidly conducted away through it, is prevented, in large measure, from passing into the reinforcing metal having a high compression factor, and as a consequence the heat of the latter never, in ordinary welding, reaches so high a temperature as to cause it to stick to the work.

In the accompanying drawing, I have indicated several forms of electrode embodying the invention.

Figure 1:
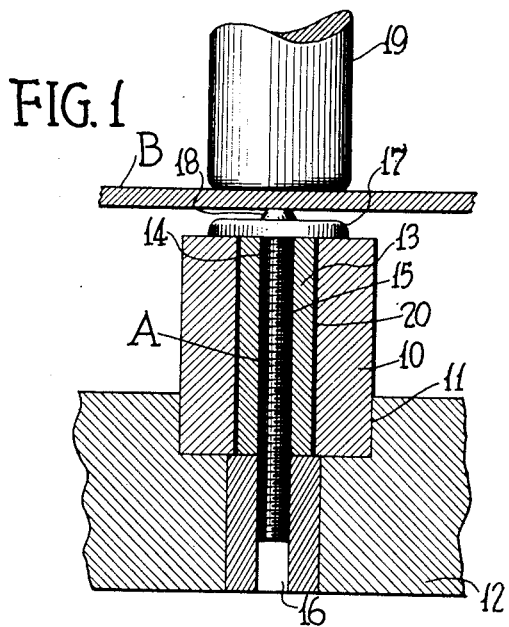
Fig. 1 shows a sectional view through an electrode and its support, according to one form of the invention, showing a weld about to be made.

The electrode according to the form of the invention shown in Fig. 1 is adapted to weld headed studs as A to a metal sheet as B. It comprises an outer annulus 10 seated in a recess 11 on a suitable welding jig 12, the annulus 10 being made of a suitable metal or metal alloy, such as copper or a copper alloy, of high electric conductivity. Within the annulus 10 is arranged a second annulus 13 having a high compression factor, such as steel or a steel alloy, this annulus being provided with a central bore 14 to receive the stem 15 of the stud A. Where the length of the stem requires it, the jig 12 is provided with a bore 16 in extension of the bore 15.

Both the annuli 10 and 13 engage the under side of the head 17 of the stud, the annulus for taking the compressive forces being arranged centrally where it is best adapted to take them. To localize the passage of the welding current, the central portion of the head 17 is formed with a knob or button 18 against which the plate B to be welded to the stud is forced by a movable electrode 19. When the pressure is applied, the welding current passes between electrode 19 and annulus 10, but the central annulus 13 takes the compressive forces. An insulating layer 20 is arranged between the annuli 10 and 13 and prevents the heat of the annulus from being transmitted to the annulus 13 in sufficient amount to cause undue heating of the supporting annulus 13. At the same time the supporting annulus takes the compression strains, and prevents mushrooming of the face of the annulus 10, which engages the work. An electrode so constructed has greatly prolonged life and requires little atention over a long series of welds.

Figure 2:
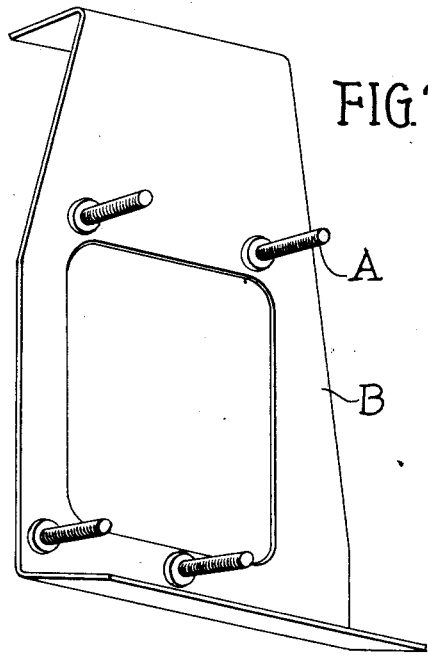
Fig. 2 shows a work piece adapted to be welded by the electrode of Fig. 1.
Figure 3:
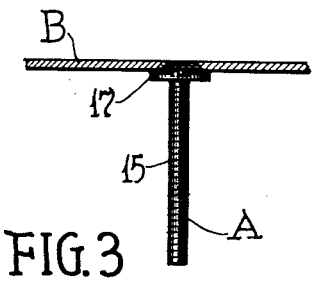
Fig. 3 is a section through the completed weld of Fig. 1.
Figure 4:
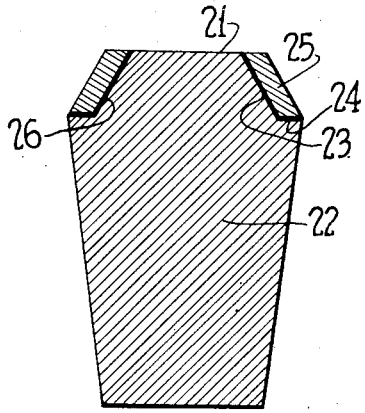
Fig. 4 is a sectional view through another form of welding electrode according to the invention.

In Fig. 4, the invention is shown applied to the usual form of electrode having a solid flattened portion for engaging the work. In this construction the central core 22 of the electrode is made of metal or metal alloy of high electric conductivity and the point thereof is provided with an annular tapered seat 23 providing a shoulder 24. Against this seat and shoulder is applied a corresponding reinforcing annulus 25 of metal or metal alloy having a high compression factor, the parts being spaced, however, as in the previously described form, by a layer of insulating material 26, to prevent the heat of the conductive core 22 from being transmitted to the supporting annulus. With this construction of electrode, as with the one previously described, mushrooming of the welding point is prevented and the point is maintained, without requiring attention, over a long series of welds.

The invention may obviously be applied to electrodes of other forms than those herein specifically shown and described, and such modifications and variations as fall within the spirit and scope of the invention are intended to be included within the meaning and scope of the claims appended hereto.

What I claim is:

1. An electrode for electric welding comprising an annulus of metal or metal alloy of high electric conductivity, and an annular reinforcing member of metal or metal alloy having a high compression factor disposed within the annular first named annulus, and a layer of insulating material separating said annuli.

2. An electrode for electric welding comprising a plurality of concentric annuli, one of said members being of relatively high electrical conductivity, one being of relatively high compressive factor, and one serving as an electrical insulating medium therebetween, and the central of said members being apertured for the reception of an elongated portion of a work piece.

ALEXANDER M. HARTMANN.